United States Patent [19]
Longwell et al.

[11] Patent Number: 5,646,556
[45] Date of Patent: Jul. 8, 1997

[54] APPARATUS AND METHOD FOR PRECHARGING BUS CONDUCTORS TO MINIMIZE BOTH DRIVE DELAY AND CROSSTALK WITHIN THE BUS

[75] Inventors: Michael L. Longwell; Joseph P. Geisler, both of Austin, Tex.

[73] Assignee: Advanced Micro Devices, Inc., Sunnyvale, Calif.

[21] Appl. No.: 562,805

[22] Filed: Nov. 27, 1995

[51] Int. Cl.[6] .............................................. H03K 19/003
[52] U.S. Cl. ............................ 326/93; 326/21; 326/86
[58] Field of Search .......................... 326/21, 27, 83, 326/86, 93, 98, 17, 26, 28, 34, 87; 365/203

[56] References Cited

U.S. PATENT DOCUMENTS

| | | | |
|---|---|---|---|
| 4,467,439 | 8/1984 | Rhodes | 326/41 X |
| 4,758,990 | 7/1988 | Uchida | 365/190 |
| 4,888,737 | 12/1989 | Sato | 365/203 |
| 4,990,801 | 2/1991 | Caesar et al. | 326/41 X |
| 5,295,104 | 3/1994 | McClure | 365/210 |
| 5,301,349 | 4/1994 | Nakata et al. | 364/491 X |

*Primary Examiner*—David R. Hudspeth
*Attorney, Agent, or Firm*—Conley, Rose & Tayon, P.C.; Kevin L. Daffer

[57] ABSTRACT

An apparatus is provided for precharging a conductor within a bus containing a plurality of conductors. The apparatus comprises a precharge driver which precharges alternating pairs of conductors to opposite rail voltages. By precharging pairs of conductors to alternating rails, the present apparatus can minimize the speed degradation problems associated with a transitioning target conductor within the bus. Precharging alternating pairs of conductors also minimizes crosstalk noise from transitioning neighbor conductors to a non-transitioning target conductor. The improved dynamic bus thereby demonstrates improvements in speed degradation and crosstalk noise as seen by a transitioning target conductor or non-transitioning target conductor, respectively.

15 Claims, 5 Drawing Sheets ns5,646,556

APPARATUS AND METHOD FOR PRECHARGING BUS CONDUCTORS TO MINIMIZE BOTH DRIVE DELAY AND CROSSTALK WITHIN THE BUS

BACKGROUND OF THE INVENTION

1. Field of the Invention

This invention relates to a multi-conductor bus and more particularly to a plurality of precharge drivers which precharge alternating pairs of conductors within the bus to opposite high and low logic levels.

2. Description of the Relevant Art

A bus is generally defined as a set of interconnect lines (or conductors) which serve to electrically connect two or more components within a system. A collection of voltage levels are forwarded across the bus to allow proper operation of the components. For example, a microprocessor is connected to memories and input/output devices by certain bus structures. There are numerous types of buses which are classified according to their operation. Examples of well known types of buses include address buses, data buses and control buses.

Conductors within a bus generally extend parallel to each other across a semiconductor topography. The conductors are isolated from each other and from underlying conductive elements by a dielectric, a suitable dielectric being, for example, silicon dioxide. FIG. 1 illustrates, in cross section, a series of conductors 10 dielectrically spaced over a semiconductor substrate 12. Conductors 10 are made from a conductive material, a suitable material includes Al, Ti, Ta, W, Mo, polysilicon, or a combination thereof. Substrate 12 includes any type of material which can retain dopant ions and the isolated conductivity regions brought about by those ions. Typically, substrate 12 is a silicon-based material which receives p-type or n-type ions. A channel region interposed between p-type source and drain regions comprise a PMOS device, while a channel region between n-type source and drain regions comprise an NMOS device.

The partial cross-section shown in FIG. 1 indicates a dielectric thickness $T_d$ between conductors 10 and substrate 12. As follows, thickness $T_d$ is partially determinative of the conductor-to-substrate capacitance $C_{LS}$.

$$C_{LS}=eW_LL/T_d \quad \text{(Eq. 1)}$$

where e is the permittivity of the dielectric material, $W_L$ is the conductor width, and L is the conductor length. Resistance of the conductor is calculated as follows:

$$R=(rL)/W_LT_i \quad \text{(Eq. 2)}$$

where r represents resistivity of the conductor material, and $T_I$ is the interconnect thickness. A product of equations 1 and 2 indicates the propagation delay of conductor 10 as follows:

$$RC_{LS}=reL^2/T_iT_d$$

Propagation delay is an important characteristic of an integrated circuit since it limits the speed (frequency) at which the circuit or circuits can operate. The shorter the propagation delay, the higher the speed of the circuit or circuits. It is therefore important that propagation delay be minimized as much as possible given the geometric constraints of the semiconductor topography.

Propagation delay is not merely a function of the line-substrate capacitance. RC delay can also be attributed to the capacitance between conductors 10. Accordingly, propagation delay is determined by parasitic capacitance values between conductors ($C_{LL}$), and the parasitic capacitance values between each conductor and substrate ($C_{LS}$). As circuit density increases, spacing ($W_S$) between conductors 10 decrease and capacitance $C_{LL}$ becomes predominant relative to $C_{LS}$. In other words, line-to-line capacitance $C_{LL}$ increases with decreasing spacing $W_S$ between conductors 10. FIG. 2 illustrates the effect of $W_S$ on $C_{LL}$. As $W_S$ decreases, $C_{LL}$ is shown to increase dramatically as compared to $C_{LS}$. Modern integrated circuits employing close interconnect spacing (e.g., below 1.5 microns) thereby define $C_{LL}$ as the primary parasitic capacitance rather than $C_{LS}$.

Increases in $C_{LL}$ pose two major problems. First, an increase in $C_{LL}$ generally causes an increase in the time at which a transition on the one end of the conductor occurs at the other end. Increase in transition time (i.e., increase in speed degradation) thereby requires a longer drive period. If the conductor is a critical path, speed degradation on that line will jeopardize functionality of the overall circuit. Second, a larger $C_{LL}$ causes an increase in crosstalk noise. A conductor which does not transition, nonetheless receives crosstalk noise from neighboring lines which do.

Speed degradation poses problems primarily during times when a target line transitions opposite the transition of neighboring lines. Speed degradation occurs primarily in statically driven bus conductors. As defined herein, a static bus is one having one or more conductors which can transition from one rail to the other or vice versa. Crosstalk noise, however, poses problems primarily during times when the target line does not transition and the neighboring lines do. Crosstalk is particularly severe in bus conductors which are dynamically driven. As defined herein, a dynamic bus is one having one or more conductors which are precharged during one phase of a clock signal, and driven to a desired logic level during another phase of that clock signal. A dynamic bus thereby requires two separate drive states, a precharge drive state and a logic drive state. The precharge state, arising from a precharge driver, forces each conductor to a precharged value of either VDD or ground. If the dynamic bus utilizes a logic high precharge (i.e., conductors precharged to VDD), it is said to be VDD-precharged. Conversely, a dynamic bus, depending upon its application, can be precharged to ground. Subsequent to precharge, a logic driver circuit causes the precharged conductor to either maintain its precharged value or be driven to the opposing rail. If, for example, a conductor is VDD-precharged, it can thereafter be conditionally discharged during the logic drive state if the desired logic value is zero. Conversely, if the desired logic value is logic high or "1", then the precharged line will not be discharged during the subsequent logic drive state.

FIG. 4 illustrates one of a plurality of conductors 10 within a dynamic bus structure 14. Conductor 10 is precharged by precharge driver 16 during phase 1 (ph1) of a clocking signal, or specifically, a logic inverse of phase 1 (xph1). During subsequent phase 2 (ph2) of the clocking signal, an x logic input is driven onto conductor 10 by logic driver 18. For example, if conductor 10 is VDD-precharged, then a high logic input x can cause discharge of conductor 10 during ph2.

An important advantage in using a dynamic bus, such as that shown by reference 14, is that logic driver 18 causes transition only in one direction. For example, a VDD-precharged conductor 10 can only be conditionally discharged to ground by logic driver 18. Since conductors 10 of dynamic bus 14 can only conditionally transition in one direction during the logic drive state, charge transferal or capacitive coupling between neighboring conductors 10 is roughly one half that of a static bus. Capacitive coupling therefore has less of an effect on speed degradation for a dynamic bus than it has for a static bus. Speed degradation and crosstalk noise are a function of line-to-line capacitive coupling. If charge transfers quickly from one line to a neighboring line, then several problems can occur in a dynamic bus structure. For example a VDD-precharged line may source charge to neighboring lines which transition to ground during a subsequent logic drive state. The precharged line may lose enough voltage to cause a receiving circuit to transition to an undesired state. Crosstalk noise from transitioning neighboring lines can therefore deleteriously affect the proper precharged value of the target line interposed between the neighboring lines.

In addition to or in lieu of dynamic buses, many circuit designs employ a static bus. Instead of precharging a conductor to VDD or ground during a precharge state, thereafter followed by a logic drive state, a static bus simply drives the conductor to the desired logic value without requiring a precharged state. A static bus 20 having one of a plurality of conductors 10 is shown in FIG. 3. Whenever a logic high value is to be driven on conductor 10, PMOS device 22 transitions on while NMOS device 24 transitions off. Conversely, if a logic low value is to be driven on conductor 10, PMOS device 22 is off while NMOS device 24 is on. During times in which the input value x is at an intermediary voltage between VDD minus PMOS threshold and ground plus NMOS threshold, both NMOS device 24 and PMOS device 22 are active on. Accordingly, static bus 20 can consume significant amount of power during the intermediate switching periods. Dynamic bus 14, however, ensures that PMOS device 16 is always off during times in which NMOS devices 18a and 18b are on, and vice versa. A dynamic bus driver add less capacitance to a bus since it does not require the full NMOS and PMOS pair, and is therefore faster. Dynamic busses consume more power than static busses since they are forced to fully charge each cycle.

FIG. 5 illustrates a conventional static bus having a plurality of conductors 10a, 10b, 10c, 10d, etc. Each conductor 10 can be driven to either power supply (i.e., VDD) or ground by a respective inverter circuit 28 and a clock enabled input signal X0, X1, X2, X3, etc. X input signal is forwarded to a respective inverter by a clocked transmission gate 30a, 30b, 30c, 30d, etc. For example, a high logic value at input X0 is forwarded during a clock high transition to inverter 28a by transmission gate 30a. Inverter 28a receives the high level input and drives a low level output upon conductor 10a. The low level output is substantially at or near ground voltage. A neighboring conductor 10b, for example, can be driven to a VDD high logic level by a low voltage level of X1. A major limitation of static bus 20 involves the effective line-to-line capacitance, $C_{LL}$ between conductors 10. If one conductor is switching while its neighbor remains at the same level, then the effective $C_{LL}$ between those conductors is $1C_{LL}$. However, if one conductor is switching toward one rail (e.g., VDD) while its neighbor is switching toward the opposite rail (e.g., ground), the effective $C_{LL}$ experienced between those conductors is $2C_{LL}$. A worst case switching scenario for a static bus, using the exemplary conductor configuration shown in FIG. 5, can be expressed in the following Table I.

TABLE I

|  | Conductor 10a | Conductor 10b | Conductor 10c |
|---|---|---|---|
| Initial State | VDD | GRN | VDD |
| Final State | GRN | VDD | GRN |

As seen in Table I, the total effective capacitance seen by transitioning conductor 10b is proportional to 4 dV/dt. Accordingly, conductor 10b sees an effective $C_{LL}$ of $4C_{LL}$ since the neighboring lines 10a and 10b are transitioning in an opposite direction to the direction in which the target conductor 10b is transitioning.

Turning now to FIG. 6, a conventional dynamic bus 14 is shown. Dynamic bus 14 includes a plurality of conductors 10a', 10b', 10c', 10d', etc. Precharged driver 16a, etc. precharges a respective conductor, while logic driver 18 subsequently drives the precharged voltage to an appropriate logic state. Drivers 18a', 18b', 18c', 18d', etc. drive a desired logic state upon respective conductors based upon the logic value of respective inputs X0, X1, X2, X3, etc. An enable circuit 32a, 32b, 32c, 32d, etc., a suitable circuit being an AND gate, can be used to enable logic driver 18 during clock phase ph2.

As described above, a dynamic bus can generally transition during the logic drive state faster than a typical static bus. However, it is important that the precharged value of a non-transitioning conductor be retained even during times when neighboring conductors transition opposite the voltage value upon the non-transitioning conductor. Any crosstalk noise caused by line-to-line capacitance from transitioning neighboring lines can deleteriously affect the desired precharged value and unfortunately cause improper switching of a receiver load device. A worst case scenario for crosstalk noise occurs when neighboring conductors transition to a rail opposite the rail in which the non-transitioning target conductor resides. Table II indicates within a conventional dynamic bus shown in FIG. 6, a worst case scenario of crosstalk noise occurring when neighboring conductors transition opposite the rail in which the non-transitioning target conductor resides.

TABLE II

|  | Conductor 10a' | Conductor 10b' | Conductor 10c' |
|---|---|---|---|
| Initial State | VDD | VDD | VDD |
| Desired Final State | GRN | VDD | GRN |
| Actual Final State | GRN | LOW | GRN |

Table II illustrates non-transitioning target conductor 10b' attempting to maintain its VDD state but, in actuality, coupling noise from transitioning neighboring lines 10a' and 10c' may cause the target conductor 10b' to incorrectly discharge to a lower voltage level. Crosstalk noise seen by conductor 10b' is directly related to the line-to-line capacitive coupling in which conductor 10b' sees two opposite-rail transitions, or an effective line-to-line capacitance of $2C_{LL}$.

While it would be desirable to utilize a fast dynamic bus architecture, it would be advantageous to be able to reduce the crosstalk noise problems associated with such an architecture. The improved dynamic bus must operate at a faster speed than a static bus. This implies that a transitioning target conductor within the improved dynamic bus must have a lower effective $C_{LL}$ than that seen by a transitioning target conductor within a conventional static bus. Further, a non-transitioning, target conductor within the improved dynamic bus must have lower effective $C_{LL}$ than a non-transitioning target conductor within a conventional dynamic bus.

SUMMARY OF THE INVENTION

The problems outlined above are in large part solved by an improved dynamic bus hereof. The improved dynamic bus demonstrates low power and ground rail bounce, and operates at higher transition speed than a conventional static bus and with lower crosstalk noise than a conventional dynamic bus. The dynamic bus preferably includes a pre-charge driver and a logic driver for each conductor within the bus. The precharge driver serves to precharge alternate pairs of conductors within the bus to alternate high and low logic levels. The precharge drivers thereby precharges conductors within a dynamic bus to, i.e., 110011001100 etc. logic values. By alternating the charge on paired conductors, the improved dynamic bus can reduce the effective $C_{LL}$ values seen by a transitioning target conductor and a non-transitioning conductor as compared to target conductors within a conventional static and dynamic bus, respectively. Accordingly, by precharging to similar rail voltages on alternating conductor pairs, the improved precharge configuration can reduce speed degradation and crosstalk noise problems.

Broadly speaking, the present invention contemplates a bus. The bus comprises a plurality of parallel-spaced conductors. Four of the plurality of parallel-spaced conductors comprise a first pair of conductors arranged in substantially the same plane and adjacent to a second pair of conductors. Two pull-up transistors are coupled between a power supply (VDD) and respective first pair of conductors. Two pull-down transistors are coupled between a respective second pair of conductors and ground voltage. A clock signal is adapted for coupling to the two pull-up circuits, and an inverse clock signal is adapted for coupling to the two pull-down circuits. As defined herein, VDD is a positive voltage preferably in the range between approximately 3.0 volts and 5.0 volts. Ground is defined to be at or substantially near 0.0 volts.

The present invention further contemplates a bus comprising a plurality of precharge drivers configured to precharge alternative pairs of conductors within the bus to alternating logic levels. The alternating logic levels consist of a power supply voltage (VDD) and a ground voltage.

The present invention still further contemplates a bus comprising a first pair of conductors interposed between a second pair of conductors and a third pair of conductors. A precharge driver circuit is coupled to the first, second and third pairs of conductors for precharging the first pair of conductors to a logic level opposite the logic level upon the second and third pairs of conductors.

BRIEF DESCRIPTION OF THE DRAWINGS

Other objects and advantages of the invention will become apparent upon reading the following detailed description and upon reference to the accompanying drawings in which.

Figure 1:
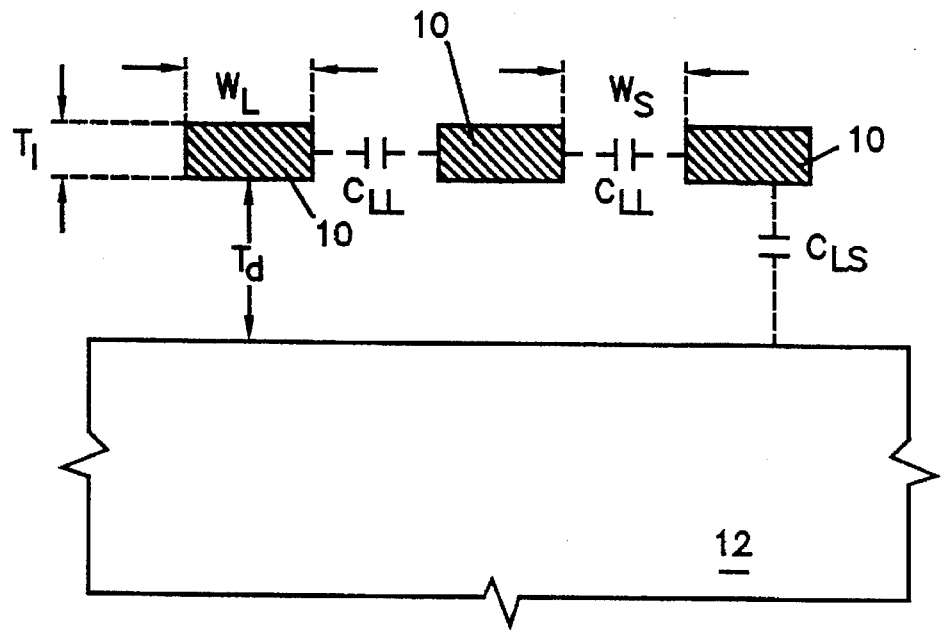
FIG. 1 is a partial cross-sectional view of an integrated circuit topography with conductors dielectrically spaced apart and above a semiconductor substrate.
Figure 2:
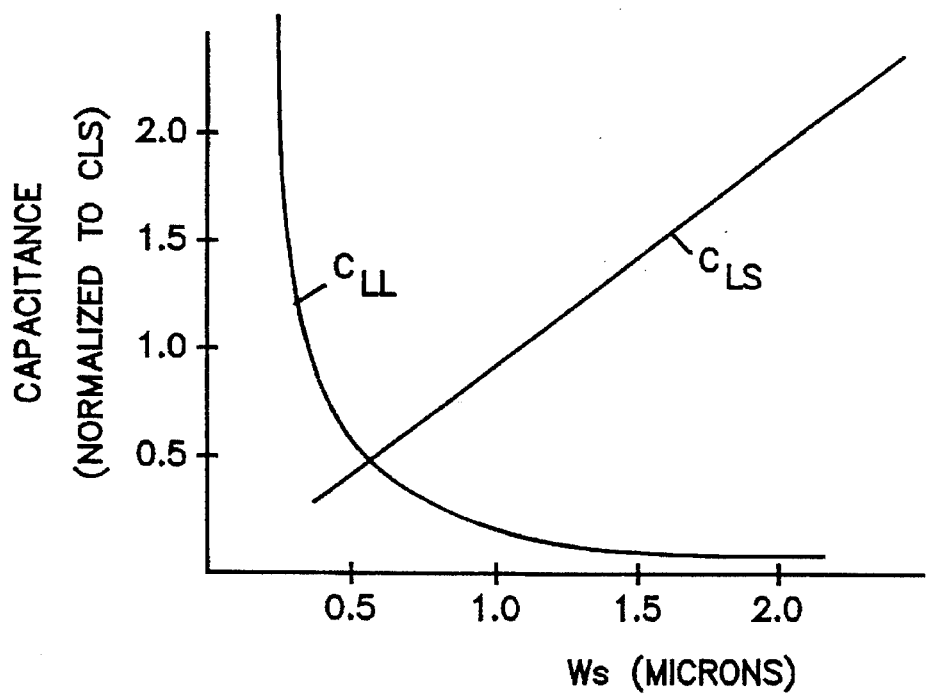
FIG. 2 is a graph of conductor-to-conductor as well as conductor-to-substrate capacitance plotted as a function of line spacing.
Figure 3:
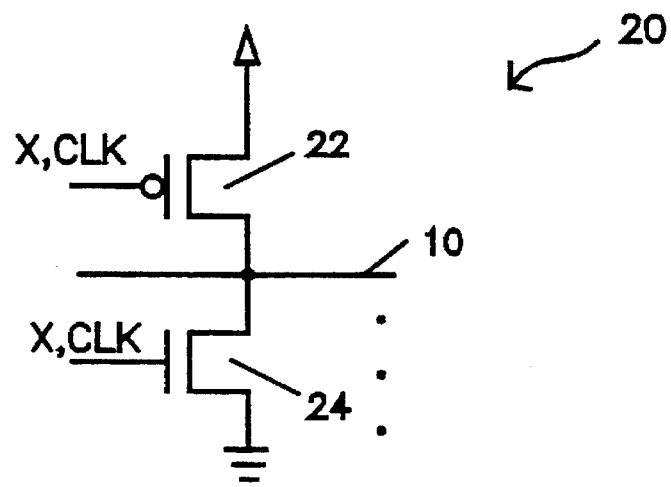
FIG. 3 is an exemplary circuit diagram of one conductor within a statically driven bus.
Figure 4:
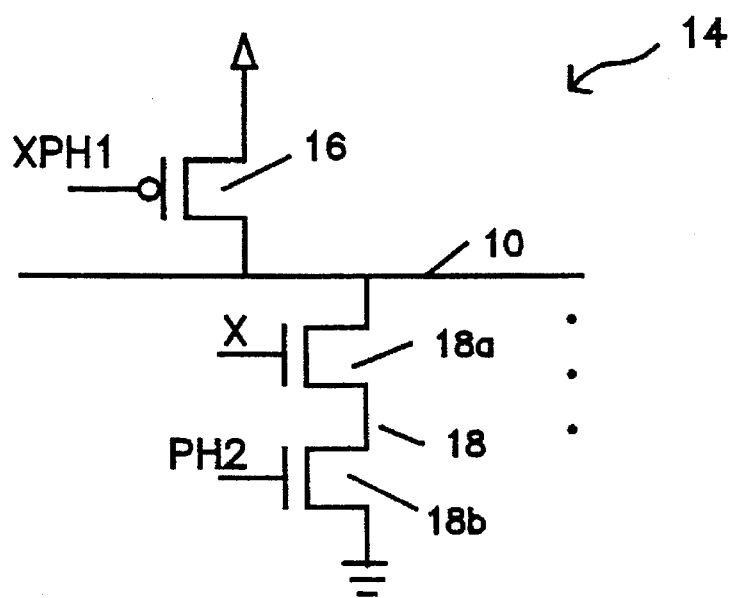
FIG. 4 is an exemplary circuit diagram of one conductor within a dynamically driven bus.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 7:
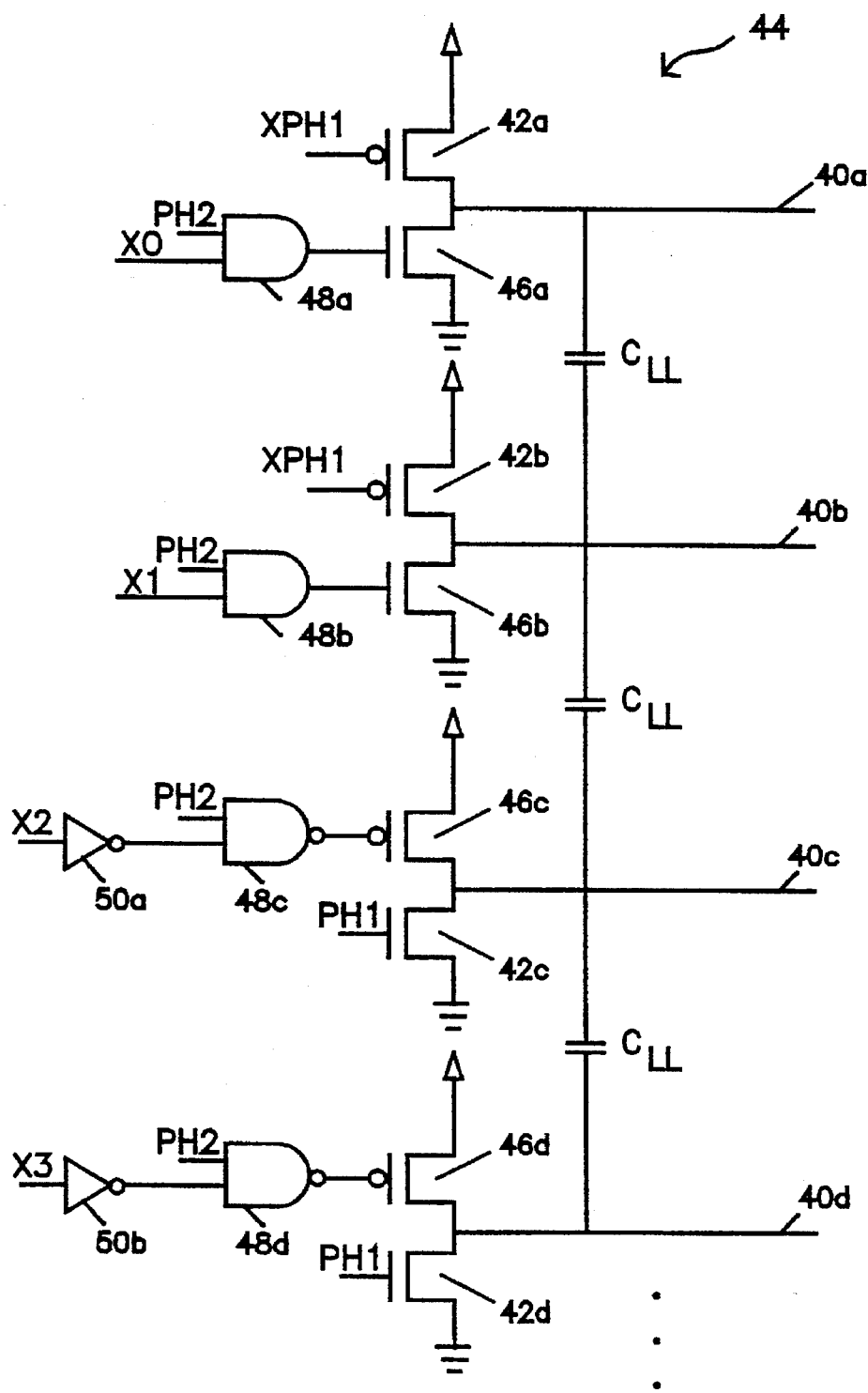
FIG. 7 is a circuit diagram of a plurality of conductors, precharge drivers, and logic drivers within a dynamically driven bus according to the present invention.

Turning now to drawings, FIG. 7 is a circuit diagram of a plurality of conductors 40a, 40b, 40c, 40d, etc. within an improved dynamic bus structure. Respective conductor 40a, 40b, 40c, 40d, etc. is driven to a precharged voltage value by respective precharge driver 42a, 42b, 42c, 42d, etc. Precharge driver 42 is active during one phase ph1, of a clocking signal. Thus, during ph1, precharge driver 42 will forward a precharged value on conductors 40a through 40d of binary bit values 1100. Accordingly, FIG. 7 illustrates an improved dynamic bus 44 having precharge drivers 42 which precharge paired conductors 40 to opposite rail values. In the example shown, conductors 40a and 40b are precharged to VDD while conductors 40c and 40d are precharged to ground.

Subsequent to precharge state, a logic drive state occurs. Logic drive state is initiated during clock phase ph2. Clock phase ph2 enables input signal X0, X1, X2 and X3 in inverted or non-inverted form upon logic driver 46a, 46b, 46c, 46d, etc. Logic drivers 46a and 46b receive output from an enabled circuit, denoted in exemplary form as respective AND gates 48a and 48b. Logic drivers 46c and 46d receive ph2-enabled input signals X2 and X3 from NAND gates 48c and 48d. Inversion is performed by inverters 50a and 50b, and NAND function is performed by NAND gates 48c and 48d, for example.

Clock xph1 is an inverse logic to ph1. Phase clock ph1 and ph2 are non-overlapping clocks. Clock ph2 is a subset of inverse ph1 clock (i.e., xph1). Clock xph1 being active low on PMOS devices 42a and 42b causes both devices to turn on. Clock ph1 being active high causes NMOS devices 42c and 42d to turn on. In a subsequent ph2, being the inverse logic of ph1, an active high logic level on input X will cause turn-on of logic driver transistors 46a and 46b, and turnoff of logic driver circuits 46c and 46d. Accordingly, a high logic level input X0, X1, X2 and X3 will translate as a low logic level upon conductors 40a, 40b, 40c and 40d. Conductors 40c and 40d are maintained at a low logic level by inhibiting the activation of logic driver transistors 46c and 46d. In converse relation, if a low level input X is forwarded during active ph2, then logic drivers 46a and 46b are turned off while logic drivers 46c and 46d are transitioned on. With logic drivers 46a and 46b off, the precharge value from transistors 42a and 42b is maintained. The result of a low logic level input X is that conductors 40c and 40d transition to a high logic level, while conductors 40a and 40b remain at a high logic level.

A comparison in performance between the improved dynamic bus 44 and a conventional static bus further clarifies the advantages of bus 44. In a worst case scenario, the speed degradation is proportional to an effective line-to-line capacitance of $3C_{LL}$, as denoted in the following Table III.

TABLE III

|  | Conductor 40a | Conductor 40b | Conductor 40c |
| --- | --- | --- | --- |
| Initial State | GRN | GRN | VDD |
| Final State | GRN | VDD | GRN |

Figure 5:
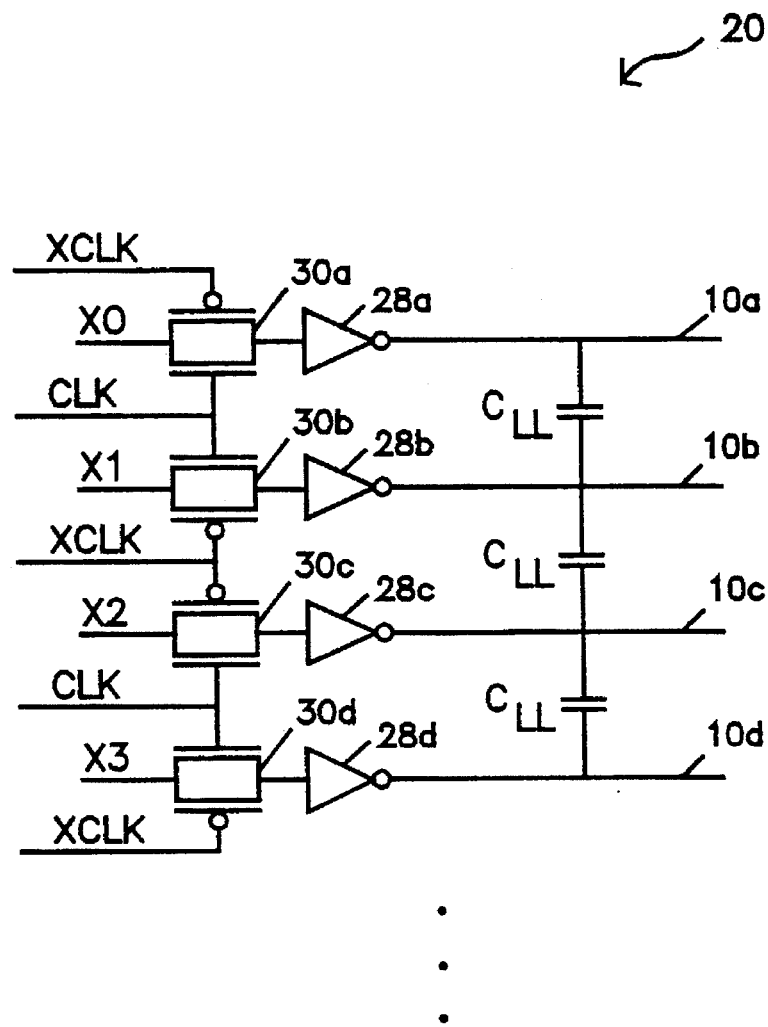
FIG. 5 is a circuit diagram of a plurality of conductors, couplers, and logic drivers within a statically driven bus.
Figure 6:
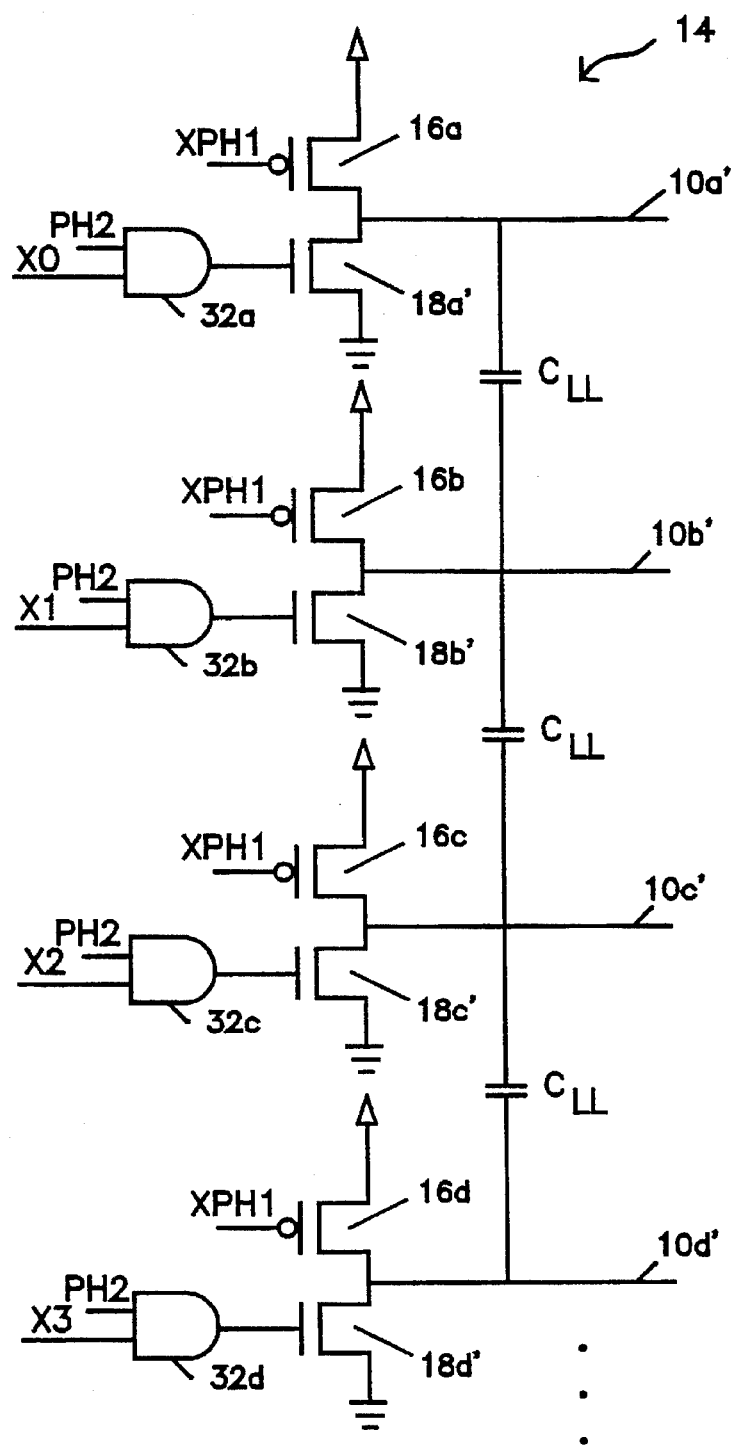
FIG. 6 is a circuit diagram of a plurality of conductors, precharge drivers, and logic drivers within a dynamically driven bus.

Table III indicates that by precharging alternate pairs to opposite rails and thereafter driving a target conductor (conductor 40b), a worst case capacitive coupling between the target conductor and neighboring conductors is $3C_{LL}$. An improvement is demonstrated by comparing the relative performances shown in Table III to a conventional static bus worst case performance shown in Table I. Instead of $4C_{LL}$, the improved dynamic bus 44 with alternate precharged pairs achieves $(4C_{LL}-3C_{LL})/4C_{LL}=25$ percent reduction in speed degradation. In other words, bus 44 achieves a 25 percent enhancement in transition speed over that of a conventional static bus such as that shown in FIG. 5.

Dynamic bus 44 also achieves a reduction in crosstalk noise compared to a conventional dynamic bus which does not precharge alternating pairs of conductors. Noise crosstalk of dynamic bus 44 is shown in Table IV for a worst case situation where neighboring conductors transition opposite the voltage upon a non-transitioning, i.e., target conductor.

TABLE IV

|  | Conductor 40a | Conductor 40b | Conductor 40c |
| --- | --- | --- | --- |
| Initial State | GRN | VDD | VDD |
| Desired Final State | GRN | VDD | GRN |
| Actual Final State | GRN | HIGH | GRN |

Compared to a conventional dynamic bus absent precharged alternate conductor pairs, dynamic bus 44 as seen by conductor 40b achieves a line-to-line capacitance from neighboring, transitioning conductors of $1C_{LL}$ rather than $2C_{LL}$ demonstrated in Table II. Reduction in effective $C_{LL}$ from $2C_{LL}$ to $1C_{LL}$ defines a 50 percent reduction in noise crosstalk, and a greater likelihood that non-transitioning, target conductor 40b maintains its high logic level in worst case instances where neighboring conductors either transition to or maintain a low logic level.

Tables III and IV illustrate a primary advantage in precharging alternate pairs of conductors. Namely, Tables III and IV indicate relative to a transitioning or non-transitioning target conductor placed intermediate the neighboring conductors (e.g., target conductor 40b intermediate neighboring conductors 40a and 40c) that only one of the neighboring conductors is transitioning against the transitioning target conductor or the desired logic state of the non-transitioning target conductor. By restricting only one neighboring line transition opposite that of the target conductor transition or desired logic level, present dynamic bus 44 suffers less speed degradation than a static bus, and will maintain target data integrity better than a conventional dynamic bus.

Precharging pairs of conductors to opposite rails provides a unique advantage over precharging each conductor to one rail. Further, precharging pairs of conductors to alternate rails also provides advantages over a scheme in which alternate conductors are precharged to opposite rails. For example, if we precharge alternate conductors to opposite rails, instead of precharging pairs of conductors to opposite rails, crosstalk noise can be eliminated but speed degradation is worsened almost down to the speed of the worst case static bus switching speed. If we precharge three or more adjacent conductors, a conductor at the center of a precharged group will exhibit a degradation in data integrity due to an increase in noise crosstalk. Accordingly, an optimal situation involves precharging a pair of adjacent conductors to a rail opposite the precharged voltage upon an adjacent pair of conductors.

It will be appreciated to those skilled in the art having the benefit of this disclosure that this invention is believed to be capable of precharging any bus having a plurality of conductors. The precharge driver hereof precharges alternating pairs of conductors within a bus to respective VDD and ground voltages. The precharge driver operates during a portion of the clock cycle defined as ph1, and a logic driver circuit operates during a portion of the clock cycle defined as ph2. Preferably, ph1 is high during times when ph2 is low. It is understood that the form of the invention shown and described is to be taken merely as presently preferred examples of how precharge drivers and logic drivers forward voltages upon respective bus conductors. The precharge and logic drivers shown in FIG. 7 can be configured in numerous ways. Any configuration falls within the spirit and scope of the present invention provided that alternating pairs of conductors are precharged to opposite rails according to the advantages cited herein. It is intended that the following claims be interpreted to embrace all such modifications and changes and, accordingly, the specification and drawings are to be regarded in an illustrative rather than a restrictive sense.

What is claimed is:

1. A bus, comprising:
    a plurality of parallel-spaced conductors, wherein four of said plurality of parallel-spaced conductors comprise a first pair of conductors arranged in substantially the same plane and adjacent to a second pair of conductors;
    two pull-up transistors coupled between a power supply and respective said first pair of conductors;
    two pull-down transistors coupled between respective said second pair of conductors and ground; and
    a clock signal adapted for coupling to said two pull-up transistors, and an inverse clock signal adapted for coupling to said two pull-down transistors.

2. The bus as recited in claim 1, wherein said two pull-up transistors comprise PMOS transistors having a gate terminal coupled to said clock signal.

3. The bus as recited in claim 1, wherein said two pull-down transistors comprise NMOS transistors having a gate terminal coupled to said inverse clock signal.

4. The bus as recited in claim 1, further comprising:
    two first drive transistors coupled between respective said first pair of conductors and ground; and
    two second drive transistors coupled between respective said second pair of conductors and said power supply.

5. The bus as recited in claim 1, wherein said clock signal comprises first and second phase periods, and wherein said two pull-up transistors include a selectable path which is driven to low resistivity during times when the first phase period of said clock signal forwards a logic low value.

6. The bus as recited in claim 1, wherein said clock signal comprises first and second phase periods, and wherein said two pull-down transistors include a selectable path which is driven to low resistivity during times when the first phase of said clock signal forwards a logic high value.

7. The bus as recited in claim 4, wherein said clock signal comprises first and second phase periods, and wherein said two first drive transistors include a selectable path which is driven to low resistivity during times when the second phase of said clock signal forwards a logic high value.

8. The bus as recited in claim 4, wherein said clock signal comprises first and second phase periods, and wherein said two first drive transistors include a selectable path which is driven to low resistivity during times when the second phase of said clock signal forwards a logic low value.

9. A bus, comprising a plurality of precharge drivers configured to precharge alternating pairs of adjacent conductors within said bus to alternating logic levels.

10. The bus as recited in claim 9, wherein said alternating logic levels consist of a power supply and a ground.

11. A bus, comprising:
a first pair of adjacent conductors interposed between a second pair of adjacent conductors and a third pair of adjacent conductors; and
a precharge driver circuit coupled to said first, second and third pairs of adjacent conductors for precharging said first pair of adjacent conductors to a logic level opposite the logic level upon the second and third pairs of adjacent conductors.

12. The bus as recited in claim 11, wherein said logic level comprises a power supply voltage or ground.

13. The bus as recited in claim 11, further comprising a driver circuit coupled to said first, second and third pairs of adjacent conductors for driving each of said first, second and third pairs of adjacent conductors to a logic level.

14. The bus as recited in claim 13, wherein said logic level is selected from the group consisting of a power supply voltage and ground.

15. The bus as recited in claim 11, wherein said precharge driver circuit comprises:
two pull-up transistors coupled between a power supply and a respective one of said first pair of adjacent conductors; and
two pull-down transistors coupled between a respective one of said second or third pair of adjacent conductors and ground.

* * * * *